United States Patent [19]

Nagano

[11] Patent Number: 4,674,617
[45] Date of Patent: Jun. 23, 1987

[54] FREEWHEEL FOR A BICYCLE

[75] Inventor: Masashi Nagano, Izumi, Japan

[73] Assignee: Shimano Industrial Company Limited, Osaka, Japan

[21] Appl. No.: 820,595

[22] Filed: Jan. 21, 1986

Related U.S. Application Data

[63] Continuation of Ser. No. 602,752, Apr. 23, 1984, abandoned.

[30] Foreign Application Priority Data

Apr. 25, 1983 [JP] Japan .................................. 58-73489
Apr. 2, 1984 [JP] Japan ............................ 59-48718[U]

[51] Int. Cl.$^4$ ............................................. F16D 13/74
[52] U.S. Cl. .............................. 192/113 B; 192/41 R; 192/64
[58] Field of Search ...................... 192/41 R, 64, 113.3

[56] References Cited

U.S. PATENT DOCUMENTS

| | | | |
|---|---|---|---|
| 1,440,161 | 12/1922 | Lippincott | 192/113 B X |
| 2,181,242 | 11/1939 | Kurzina, Jr. | 192/64 |
| 2,394,112 | 2/1946 | Schwinn | 192/64 |
| 2,489,934 | 11/1949 | Schwinn | 192/64 |
| 3,010,553 | 11/1961 | Van der Plas | 192/64 |
| 3,166,171 | 1/1965 | Schwerdhofer et al. | 192/64 |
| 3,175,661 | 3/1965 | Maurer et al. | 192/113 B X |
| 3,554,340 | 1/1971 | Shimano et al. | 192/64 |
| 4,102,215 | 7/1978 | Nagano et al. | 192/64 X |
| 4,131,188 | 12/1978 | Charchian | 192/113 B |
| 4,494,638 | 1/1985 | Zenber | 192/113 B X |

FOREIGN PATENT DOCUMENTS

| | | | |
|---|---|---|---|
| 436862 | 4/1912 | France. | |
| 797343 | 4/1936 | France. | |
| 1091193 | 4/1955 | France. | |
| 2352225 | 1/1978 | France | 192/64 |

Primary Examiner—A. Michael Chambers
Assistant Examiner—John C. Fox
Attorney, Agent, or Firm—Stevens, Davis, Miller & Mosher

[57] ABSTRACT

A freewheel for a bicycle having an annular space formed between a cylindrical driving member carrying sprockets and a cylindrical driven member and between a pair of bearings supporting the driving member rotatably with respect to the driven member. The annular space is closed by sealing rings, and the driving member is provided with an oil feeding conduit which is open at one end into the annular space and at the other end outwardly from the driving member.

13 Claims, 13 Drawing Figures

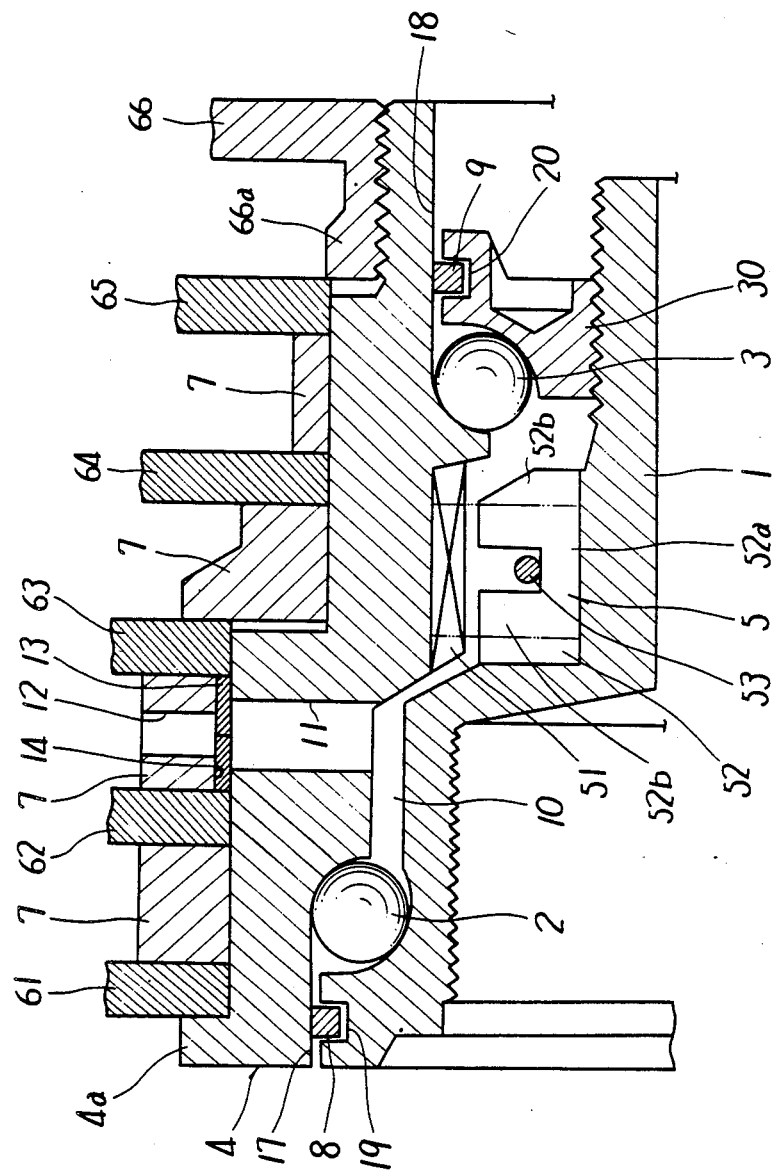

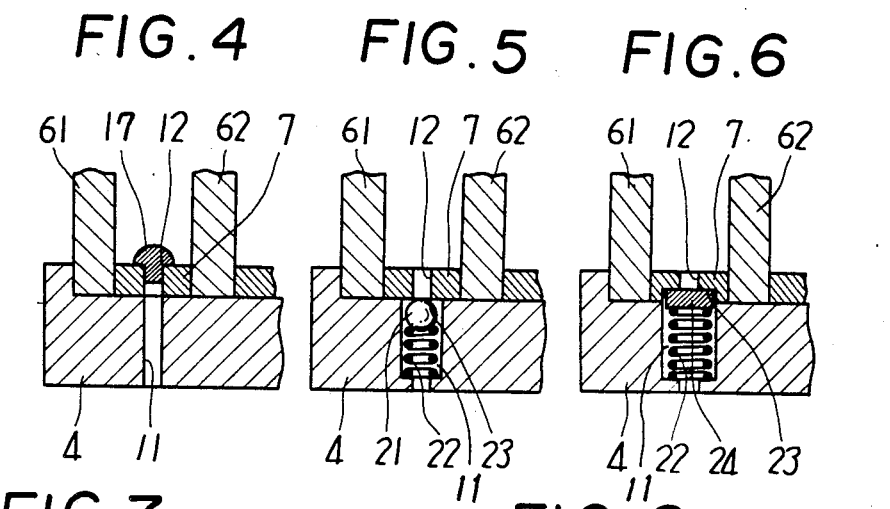
FIG. 4   FIG. 5   FIG. 6
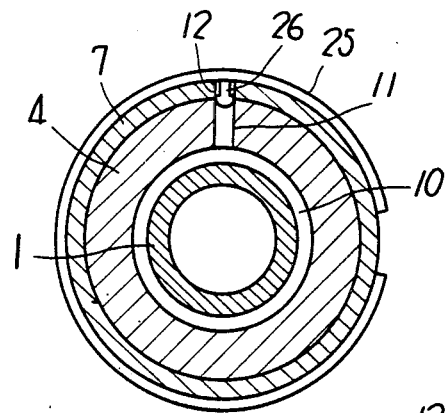   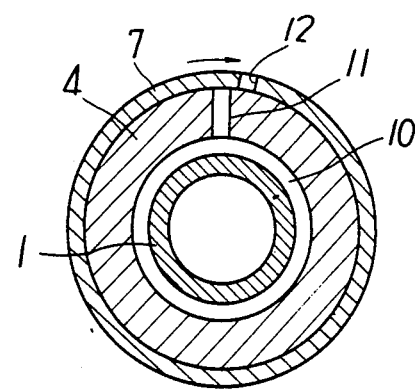
FIG. 7   FIG. 8
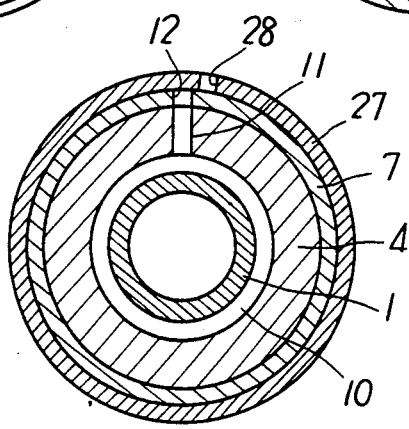
FIG. 9

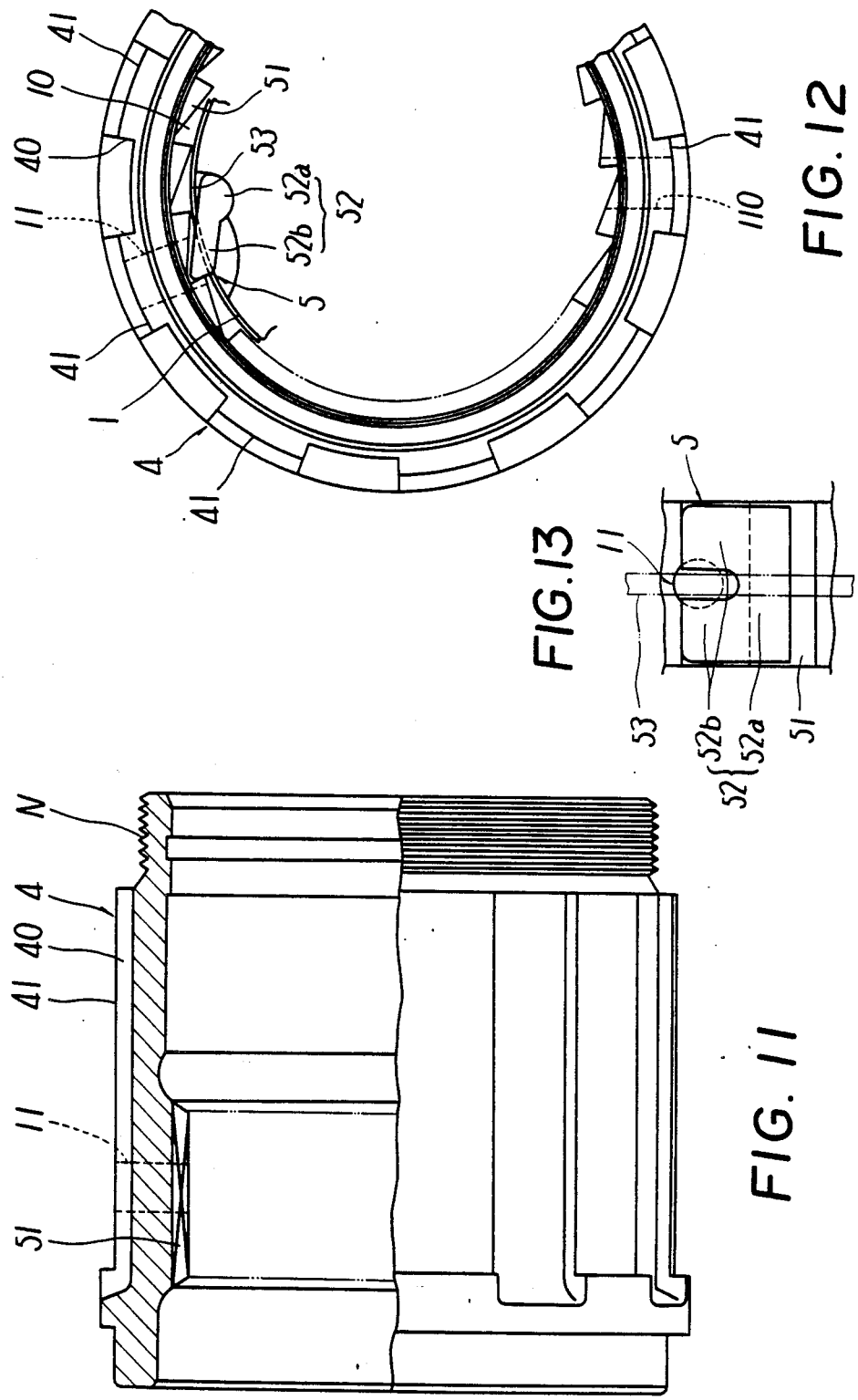

FREEWHEEL FOR A BICYCLE

This application is a continuation of application Ser. No. 602,752, filed Apr. 23, 1984, now abandoned.

FIELD OF THE INVENTION

This invention relates to a freewheel for a bicycle, and more particularly, to a freewheel for a bicycle, having at least one sprocket, a cylindrical driving member supporting the sprocket, a cylindrical driven member, a pair of bearings for supporting the cylindrical driving member rotatably to the cylindrical driven member, and a unidirectional rotary transmission disposed between the driving member and the driven member and transmitting only unidirectional rotation of the driving member to the driven member.

BACKGROUND OF THE INVENTION

Conventionally, a bicycle freewheel is given grease into bearings which support the cylindrical driving member, so that the driving member including the sprockets is smoothly rotatable.

The grease functions effectively for a relatively long time, but not permanently, whereby it is preferable to supply a labricating oil instead of grease, or together therewith.

The freewheel for the bicycle, however, is provided with a pair of ball bearings for supporting the driving member rotatably to the driven member at both axial ends thereof, whereby the bearings hinder the supply of lubricating oil into an annular space between the driving member and the driven member.

Hence, even when a user feeds a lubricating oil to the driving member with the intention of feeding it into the aforesaid annular space, he cannot actually do so. Hence, the lubricating ability of the driving member is improved temporarily, but not kept sufficient for a long time.

SUMMARY OF THE INVENTION

An object of the invention is to provide a freewheel for a bicycle, which forms a close annular space between the cylindrical driving member and the driven member and across a pair of bearings so that a lubricating oil can simply and quickly be supplied into the space without being affected by the bearings.

This invention is characterized in that the freewheel, includes at least one sprocket, a cylindrical driving member supporting the sprocket, a cylindrical driven member, a pair of bearings supporting the driving member rotatably to the driven member, and a unidirectional rotary transmission disposed between the driving member and the driven member and for transmitting only the unidirectional rotation of driving member to the driven member. The freewheel includes an annular space between the cylindrical driving member and the cylindrical driven member and between the pair of bearings sealing means are provided, between the driving member and the driven for closing the annular space. The driving member includes at least one oil-feeding conduit open at one end thereof into the annular space and open at the the other end outwardly from the driving member. At the outer surface thereof the freewheel includes closing means for closing the opening of the oil-feeding conduit.

The closing means is released to open the oil-feeding conduit and to facilitate oil feed into the space, thereby enabling continuous smooth rotation of the driving member.

Incidentally, the closing means may use a valve, or may, when a plurality of sprockets and spacers constitute a sprocket assembly, utilize a sprocket or a spacer.

The above and further objects and novel features of the invention will more fully appear from the following detailed description when the same is read in connection with the accompanying drawings.

BRIEF DESCRIPTION OF THE DRAWINGS

FIG. 2 is an enlarged sectional view of the principal portion of the FIG. 1 embodiment, FIG. 3 is an illustration of a lid, FIGS. 4 through 9 are illustrations of modified embodiments of the lid, FIG. 11 is a partially sectional front view of a cylindrical driving member in the FIG. 10 embodiment, FIG. 12 is a partially omitted side view of the cylindrical driving member in FIG. 11 when viewed from the right hand side, showing the relation between the cylindrical driving member and a unidirectional rotary transmission, and FIG. 13 is a view explanatory of the relation between ratchet teeth and a pawl at the unidirectional rotaty transmission and an internal opening of an oil feeding conduit in the FIG. 10 embodiment.

DETAILED DESCRIPTION OF THE INVENTION

Figure 1:
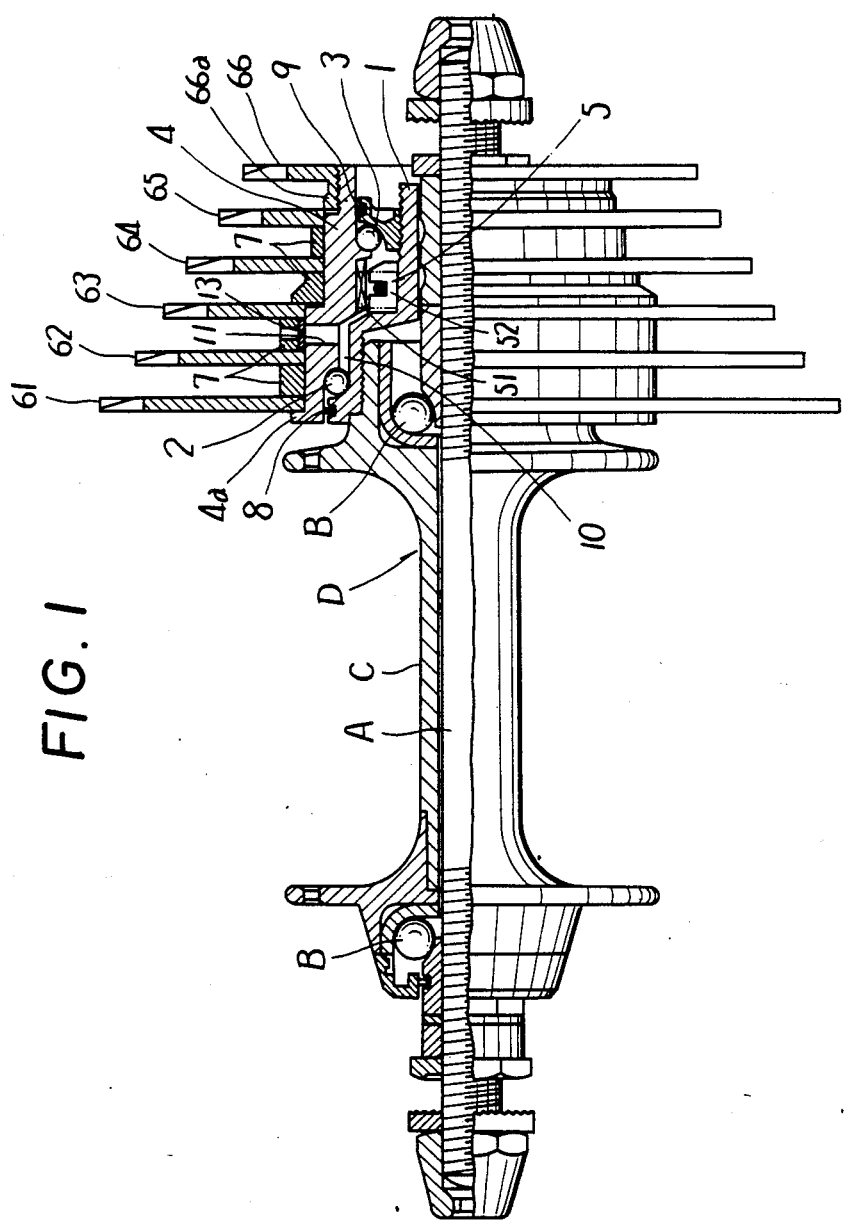
FIG. 1 is a partially cutaway front view of a typical embodiment of the freewheel of the invention, which is mounted to a rear hub at the bicycle.

Referring to FIG. 1, the freewheel of the invention is applied to a rear hub D comprising a hub shaft A fixed at both ends to the bicycle frame and a hub trunk C supported rotatably to the hub shaft A through bearings B. At first, explanation will be given on a first embodiment shown in FIGS. 1 and 2, in which reference numeral 1 designates a cylindrical driven member screwing with the outer periphery of one axial end of hub trunk C. A cylindrical driving member 4 is supported rotatably to the driven member 1 through a pair of bearings 2 and 3 and a unidirectional rotary transmission 5 is provided between the driving member 4 and the driven member 1.

The unidirectional rotary transmission 5, as shown in FIG. 2, comprises ratchet teeth 51 provided circumferentially at the inner periphery of driving member 4 and a pawl 52 swingably engaging or disengaging with or from the ratchet teeth 51 and biased in the direction of engaging therewith through a spring wire 53.

The pawl 52, as shown in FIG. 2, comprises a support 52a supported swingably to the driven member 1 and furcate engaging portions 52b engageable with the ratchet teeth 51 and integral with the support 52a. Spring wire 53 is interposed into a gap between the engaging portions 52b and biases them to engage with the ratchet teeth 51.

The cylindrical driving member 4 is provided at the outer periphery with splines, at one axial end with a flange 4a, and at the other axial end with a screw thread. As a result sprockets 61, 62, 63, 64 and 65 arranged in the diameter-decreasing order from the largest diameter one 61, are spline-connected to the driving member 4, with the smallest diameter sprocket 66 having a cylinder 66a which is integral therewith. Cylinder 66a has a screw thread and serves as a spacer. The smallest diameter sprocket 66 screws with the driving member 4 through the cylinder 66a to thereby fix onto the outer periphery of driving member 4 the sprockets 61 to 66 including the spacers 7 therebetween.

The freewheel of the invention constructed as foregoing closes by use of sealing means, to be discussed below in annular space 10 formed between the cylindrical driving member 4 and the cylindrical driven member 1 and across the bearings 2 and 3, thereby forming a closed space. The freewheel of the present invention includes at the driving member 4 a first oil feeding conduit 11 which opens at one end thereof into the space 10 and at the other end outwardly from the driving member 4. The opening of conduit 11 at the outer periphery of driving member 4 is adapted to be closed by a closing means to be discussed below.

The sealing means in the first embodiment shown in FIGS. 1 and 2 comprise sealing rings 8 and 9 disposed axially outwardly from the bearings 2 and 3 respectively. In detail, at the inner periphery of driving member 4 and axially outwardly of the bearings 2 and 3 are provided slidable surfaces 17 and 18 of predetermined lengths respectively. Annular grooves 19 and 20 located opposite to the slidable surfaces 17 and 18 are provided at the cylindrical driven member 1 and a ball holder 30 of bearing 3 screwing with the driven member 1 respectively. Sealing rings 8 and 9 each sized to be freely fitted into the grooves 19 and 20 are fitted therein to close the space 10 respectively.

The first oil feeding conduit 11 is disposed between the sprockets 62 and 63 to open outwardly through a second oil feeding conduit 12 formed at a spacer 7 interposed between the sprockets 62 and 63. Thus, the conduits 11 and 12 perforate radially inwardly the spacer 7 and driving member 4 and communicate with the space 10.

Also, the closing means comprises a valve 13 as shown in FIG. 3.

The valve 13 is formed of an elastic plate having a plurality of tongues 16 to open or close the oil feeding conduit 11. A recess 14 for receiving therein the valve 13 is formed around the opening of second oil feeding conduit 12 at the inner periphery of spacer 7, so that the valve 13 is sized to mate with the recess 14 and to be fitted therein and held by the spacer 7.

Also, the valve 13, as shown in FIG. 3, has cuts 15 crosswise the elastic plate to form four tongues 16. An oil pipe W is inserted into the first oil feeding conduit 11 through the second oil feeding conduit 12 and pushes open the tongues 16 so that the oil is fed simply into the space 10. Then the pipe W is drawn off from the valve 13 to automatically close the tongues 16 by means of elasticity thereof, thus ensuring the sealing of supplied oil and preventing mud or the like from entering into the space 10.

In the aforesaid construction, the valve 13, which is interposed and held between the spacer 7 and the driving member 4, is usable even when not-weatherproof, thereby being inexpensive to produce to that extent.

Alternatively, the oil feeding conduit 11 may be slanted radially of the driving member 4, or may be not straight but curved or bent.

Also, the oil feeding conduit 11 may of course be open at any spacer 7 or at cylindrical portion 66a and also at any sprocket from which the conduit 11 communicates with the space 10 through any spacer 7 or cylindrical portion 66a, or the conduit 11 can be open at any sprocket and communicate directly with the space 10. Also, the conduit 11 may alternatively be formed at the cylindrical driving member 4 only as in a second embodiment to be discussed below. A plurality of oil feeding conduits may be provided, or the oil feeding conduit and an oil drain may be provided. In any case, the closing means of course is provided.

The valve 13 may alternatively be provided at a desired position at the oil feeding conduit 11 or 12, in other words, the outward opening, an intermediate portion, or the opening into the space 10, of oil feeding conduit 11 or 12.

Also, the valve 13 may use a plug to be fitted into the second oil feeding conduit 12 engageably or disengageably therewith or therefrom as shown in FIG. 4. Or, the oil feeding conduit 11, as shown in FIG. 5, may use a ball-like valve 21, which is biased by a spring 22 toward a valve seat 23 at the spacer 7 to thereby close the conduit 11, and with an oil pipe being used to push open the valve 21 against the biasing force of spring 22. A plate-like valve 24 may, as shown in FIG. 6, be used instead of the ball-like valve 21. Furthermore, an elastic band 25 of a C-like shape, as shown in FIG. 7, may have a plug 26 projecting inwardly and may be mounted detachably to the outer periphery of spacer 7 so that the plug 26 may be inserted into or removed from the second oil feeding conduit 12. Also, these valves 13, 21 and 24 which are operated lengthwise of oil feeding conduit 11, may alternatively be operated to open or close by circumferentially slidably moving the spacer 7 as shown in FIG. 8. Alternatively, a circumferentially slidable rotary member 27 may, as shown in FIG. 9, be provided at the outer periphery of spacer 7 and a communicating bore 28 coincident with the second oil feeding conduit 12 may be provided at the rotary member 27, thereby slidably rotating the rotary member 27 to open or close the first oil feeding conduit 11.

Next, explanation will be given of a second embodiment of the invention shown in FIG. 10, which is adapted to utilize an assembly 6 of sprockets 61 to 65, spacers 7 and cylindrical driving member 4, so that the first oil feeding conduit 11 is closed.

The sprocket assembly 6 is so constructed that the largest diameter sprocket 61 and middle diameter ones 62 to 64 and spacers 7 interposed therebetween are connected by a bolt 6a perforating the three sprockets and spacers 7 and screwing with the sprocket 64 to form a sprocket unit. The sprocket unit is fitted onto the driving member 4 through a spline connection. The smallest diameter sprocket 65 has a cylindrical portion 65a integral therewith and is screwed detachably to the cylindrical driving member 4 through a screw means N, thus enabling the sprocket assembly 6 to be easily detachably mounted to the driving member 4.

The sprocket unit is formed to facilitate mounting or dismounting of sprocket assembly 6. Alternatively, the sprockets may, as shown in FIG. 1, be mounted separately to the driving member 4, or the sprockets 61 to 65 may be assembled by a bolt 6a into a sprocket unit (not shown), which is spline-fitted onto the driving member 4, to be thereafter tightened by use of a screw means N of a nut. In addition, the bolt 6a may be replaced by a rivet.

Figure 10:
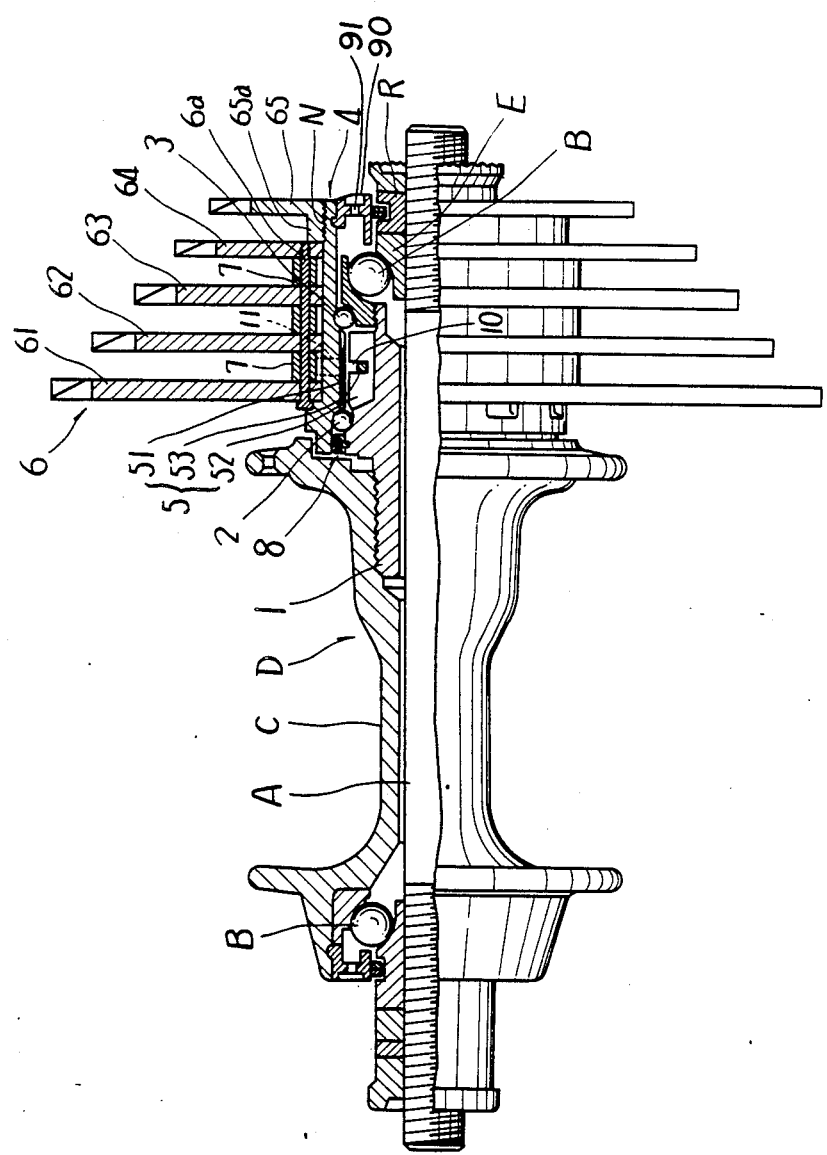
FIG. 10 is a partially cutaway front view of a modified embodiment of the freewheel of the invention, corresponding to FIG. 1.

The second embodiment in FIG. 10 is basically the same as the first embodiment, in which the sprocket assembly 6 is adapted to close an oil feeding conduit open at one end into the space 10 and at the other end outwardly from the sprocket assembly mounting portion at the driving member 4.

In detail, the oil feeding conduit 11 in FIG. 10 is provided at a top end 41 of spline 40 at the driving member 4 and between the largest diameter sprocket 61 and the sprocket 62 adjacent thereto. The opening of conduit 11 into the space 10 is selected to be positioned inside the ratchet teeth 51 and correspond to a cutout between the tips of furcate engaging portions 52b at the pawl 52 as shown in FIGS. 12 and 13.

Furthermore, the second embodiment is provided at the driving member 4 with an oil drain 110 opposite to the oil feeding conduit 11. Kerosene for washing is put into the space 10 from the conduit 11, and after washing, the waste oil is discharged through the oil drain 110. Thereafter, a lubricating oil is put into the space 10 until no waste oil remains therein.

The second embodiment in FIG. 10, which constitutes a unit hub, has a sealing means located axially outside a bearing B for supporting the hub C to the hub shaft A and outside of space 10. The sealing unit comprises an annular groove provided at a lock nut R for fixing the ball holder E and a sealing member 90 having a grease bore 91 and fitted into the annular groove. In addition, a sealing means at the axial inside of space 10 uses a sealing member 8 the same as in the first embodiment.

Thus, the second embodiment is performable of the aforesaid washing and oil feeding can be performed in the second embodiment merely by removal of the sprocket assembly 6 from the driving member 4.

After the oil feeding, the sprocket assembly 6 is mounted onto the driving member 4 by the screw means N, and the spacer 7 between the sprockets 61 and 62 closes the oil feeding conduit 11.

Now, a road racing bicycle is desired to reduce the number of teeth at the sprockets 61 to 65 as much as possible to increase the acceleration gear ratio. Each sprocket, however, must have a predetermined radial length from the tooth tip to the fitting portion into the driving member 4 for considerations of strength, thereby limiting the outer diameter of driving member 4 to be less than a value corresponding to the aforesaid predetermined radial length. Thus, when a sprocket of smaller number of teeth is used, the cylindrical driven member 1 and driving member 4 have to be reduced in radial length as much as possible.

Hence, even for the road racing bicycle having the driving member 4 smaller in thickness, the oil feeding conduit 11 is formed at the top end 41 of spline 40 and at the portion of ratchet teeth 51 where no engaging load is originally applied, whereby the driving member 4 is not essentially deteriorated in strength, but optimally provides the least necessary strength.

Alternatively, the second embodiment may be applicable to the so-called boss-type freewheel as in the first embodiment in FIGS. 1 and 2, or the so-called flash type freewheel which provides a cylindrical portion at the larger diameter sprocket and supports the smaller diameter sprockets on the cylindrical portion.

Also, the first embodiment in FIGS. 1 and 2 may be applicable to the unit hub as in the second embodiment, and to the aforesaid flush type freewheel, only one sprocket, or the unit hub type.

Although several embodiments have been described, they are merely exemplary of the invention and not to be construed as limiting, the invention being defined solely by the appended claims.

What is claimed is:

1. A freewheel for a bicycle comprising at least one sprocket, a cylindrical driving member for supporting said sprocket, a cylindrical driven member, a pair of bearings supporting said cylindrical driving member rotatably with respect to said cylindrical driven member, and a unidirectional rotary transmission disposed between said cylindrical driving member and said cylindrical driven member, said transmission for transmitting only unidirectional rotation of said cylindrical driving member to said cylindrical driven member, an annular space being located between said cylindrical driving member and said cylindrical driven member and between said pair of bearings, a pair of sealing means disposed at axially outer sides of said pair of bearings and between said cylindrical driving member and said cylindrical driven member for closing said space, at least one oil feeding conduit formed in said cylindrical driving member and open at one end into said annular space and at another end outwardly from said cylindrical driving member, closing means for closing an opening of said another end of said oil feeding conduit outside of said cylindrical driving member, and at least one oil drain formed in said cylindrical driving member and open at one end into said annular space and at another end outwardly from said cylindrical driving member, said oil drain being disposed substantially 180° opposite to said oil feeding conduit.

2. A freewheel for a bicycle according to claim 1, wherein said sealing means comprise a sealing ring and an annular groove receiving therein said sealing ring, said annular groove being formed in at least one of said cylindrical driving member and said cylindrical driven member.

3. A freewheel for a bicycle according to claim 1, wherein said closing means comprises a valve.

4. A freewheel for a bicycle, comprising a sprocket assembly comprising a plurality of sprockets and a plurality of spacers for keeping said sprockets spaced relative to each other at predetermined intervals, a cylindrical driving member for supporting said sprocket assembly, a cylindrical driven member, a pair of bearings for supporting said cylindrical driving member rotatably with respect to said cylindrical driven member, and a unidirectional rotary transmission disposed between said cylindrical driving member and said cylindrical driven member, said transmission for transmitting only unidirectional rotation of said cylindrical driving member to said cylindrical driven member, an annular space being provided between said cylindrical driving member and said cylindrical driven member and between said pair of bearings, a pair of sealing means for closing said space and disposed at axially outer sides of said pair of bearings and between said cylindrical driving member and said cylindrical driven member, at least one first oil feeding conduit formed in said cylindrical driving member and open at one end into said annular space and at another end outwardly from said cylindrical driving member, a closing means for closing an opening of said another end of said first oil feeding conduit outside of said cylindrical driving member, and at least one oil drain formed in said cylindrical driving member and open at one end into said annular space and at another end outwardly from said cylindrical driving member, said oil drain being disposed substantially 180° opposite to said oil feeding conduit.

5. A freewheel for a bicycle according to claim 4, wherein said sealing means comprise a sealing ring and an annular groove receiving said sealing ring, said annular groove being formed in at least one of said cylindrical driving member and said cylindrical driven member.

6. A freewheel for a bicycle according to claim 4, wherein said sprocket assembly and cylindrical driving member include screw means for mounting said sprocket assembly detachably to said cylindrical driving member, said sprocket assembly comprising closing means for closing said first oil feeding conduit.

7. A freewheel for a bicycle according to claim 4, wherein said closing means comprises a valve.

8. A freewheel for a bicycle according to claim 7, wherein said valve comprises an elastic plate having a plurality of tongues for opening and closing an opening of an end of said first oil feeding conduit, said valve comprising said elastic plate being held on a said spacer at said sprocket assembly.

9. A freewheel for a bicycle according to claim 4, wherein a said spacer at said sprocket assembly includes a second oil feeding conduit in continuation of said first oil feeding conduit, said spacer having said closing means mounted thereon.

10. A freewheel for a bicycle according to claim 4, wherein a said spacer at said sprocket assembly includes a second oil feeding conduit in continuation of said first oil feeding conduit, said second oil feeding conduit having a valve seat, said first oil feeding conduit at said cylindrical driving member including a valve comprising a spring end and a valve body.

11. A freewheel for a bicycle according to claim 4, further comprising screw means for mounting said sprocket assembly detachably to said cylindrical driving member, at least one of said spacers at said sprocket assembly being separate from said sprockets and rotatable with respect to said cylindrical driving member when said screw means is unscrewed, said spacer having a communicating conduit communicating in a first position with said first and second oil feeding conduits, said spacer being rotatable to a second position wherein it does not cause said communicating conduit to mate with said first and second oil feeding conduits, thereby closing said oil feeding conduit.

12. A freewheel for a bicycle according to claim 4, wherein said unidirectional rotary transmission comprises ratchet teeth disposed at the inner periphery of said cylindrical driving member and a transmitting pawl which is engageable with said ratchet teeth and is supported to said cylindrical driven member, said oil feeding conduit being provided at the portion of said cylindrical driving member where said ratchet teeth are formed.

13. A freewheel for a bicycle according to claim 4, wherein said cylindrical driving member includes a spline which connects the sprocket assembly to an outer periphery of the cylindrical driving member such that the sprocket assembly is non-rotatable relative to the cylindrical driving member, said oil feed conduit and said oil drain being disposed at a top end of said spline.

* * * * *